United States Patent [19]

Hettes et al.

[11] Patent Number: 5,108,155
[45] Date of Patent: Apr. 28, 1992

[54] METHOD AND APPARATUS FOR MAKING A BRUSHING TOOL

[75] Inventors: Frank J. Hettes, Greentown; Karl M. Weiler, Buck Hill Falls; John Braney, Cresco, all of Pa.

[73] Assignee: Weiler Brush Company, Inc., Cresco, Pa.

[21] Appl. No.: 545,434

[22] Filed: Jun. 28, 1990

[51] Int. Cl.$^5$ .............................................. A46D 3/00
[52] U.S. Cl. ...................................... 300/21; 264/243
[58] Field of Search ........................................ 300/2–11, 300/21; 264/243; 425/805

[56] References Cited

U.S. PATENT DOCUMENTS

| | | | |
|---|---|---|---|
| 541,793 | 7/1895 | Kane | 264/243 X |
| 2,190,206 | 2/1940 | Churchill . | |
| 2,604,362 | 7/1952 | Sugerman et al. . | |
| 2,634,167 | 4/1953 | Bible | 264/243 X |
| 2,643,158 | 6/1953 | Baldanza | 264/243 |
| 2,655,409 | 10/1953 | Baldanza | 264/243 X |
| 3,216,034 | 11/1965 | Johnson . | |
| 3,307,211 | 3/1967 | Gaines . | |
| 3,373,739 | 3/1968 | Rankin . | |
| 3,390,412 | 7/1968 | Wolter et al. . | |
| 3,610,692 | 10/1971 | Van der Molen et al. | 425/805 X |
| 3,822,432 | 7/1974 | Skinner . | |
| 4,092,758 | 6/1978 | Horter et al. . | |

FOREIGN PATENT DOCUMENTS

| | | |
|---|---|---|
| 0196928 | 10/1986 | European Pat. Off. . |
| 815034 | 9/1951 | Fed. Rep. of Germany . |
| 1005928 | 4/1957 | Fed. Rep. of Germany . |
| 2709899 | 9/1978 | Fed. Rep. of Germany ...... 264/243 |
| 2165742 | 4/1986 | United Kingdom . |

Primary Examiner—Mark Rosenbaum
Attorney, Agent, or Firm—Seidel, Gonda, Lavorgna & Monaco

[57] ABSTRACT

A method is disclosed for making a brushing tool having a hub and a plurality of bristles extending from the hub. A mold defines a cavity which is divided into a closable mold cavity and a bristle cavity. At least one bristle locating pin is disposed within the bristle cavity. At least one bundle of bristles is inserted into the bristle cavity adjacent to the at least one bristle locating pin so that one end of the bristles is disposed within the mold cavity. The mold cavity is then closed so that the ends of the bristles within the mold cavity are generally clamped together near the interface of the mold cavity and the bristle cavity. A thixotropic material in liquid form is injected into the mold cavity so that a portion of each bristle disposed within the mold cavity is surrounded by the thixotropic material. When the thixotropic material hardens, the portion of each bristle on the mold cavity becomes embedded in the hardened material, the hardened material thereby forming the hub of the brushing tool. In a preferred embodiment, the method is applied to a rotary brushing tool having a central hub and a plurality of bristles extending from the hub.

2 Claims, 4 Drawing Sheets

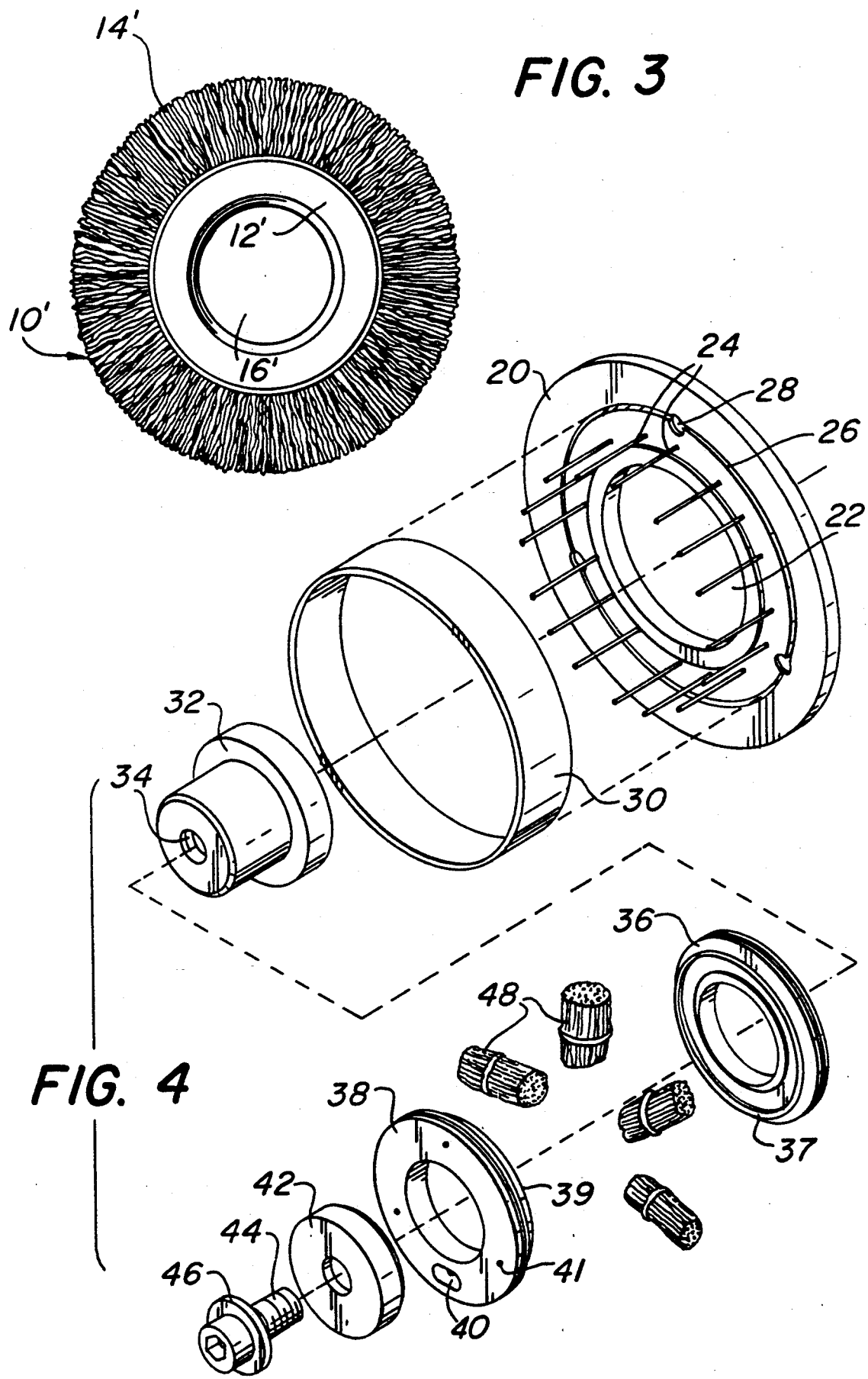

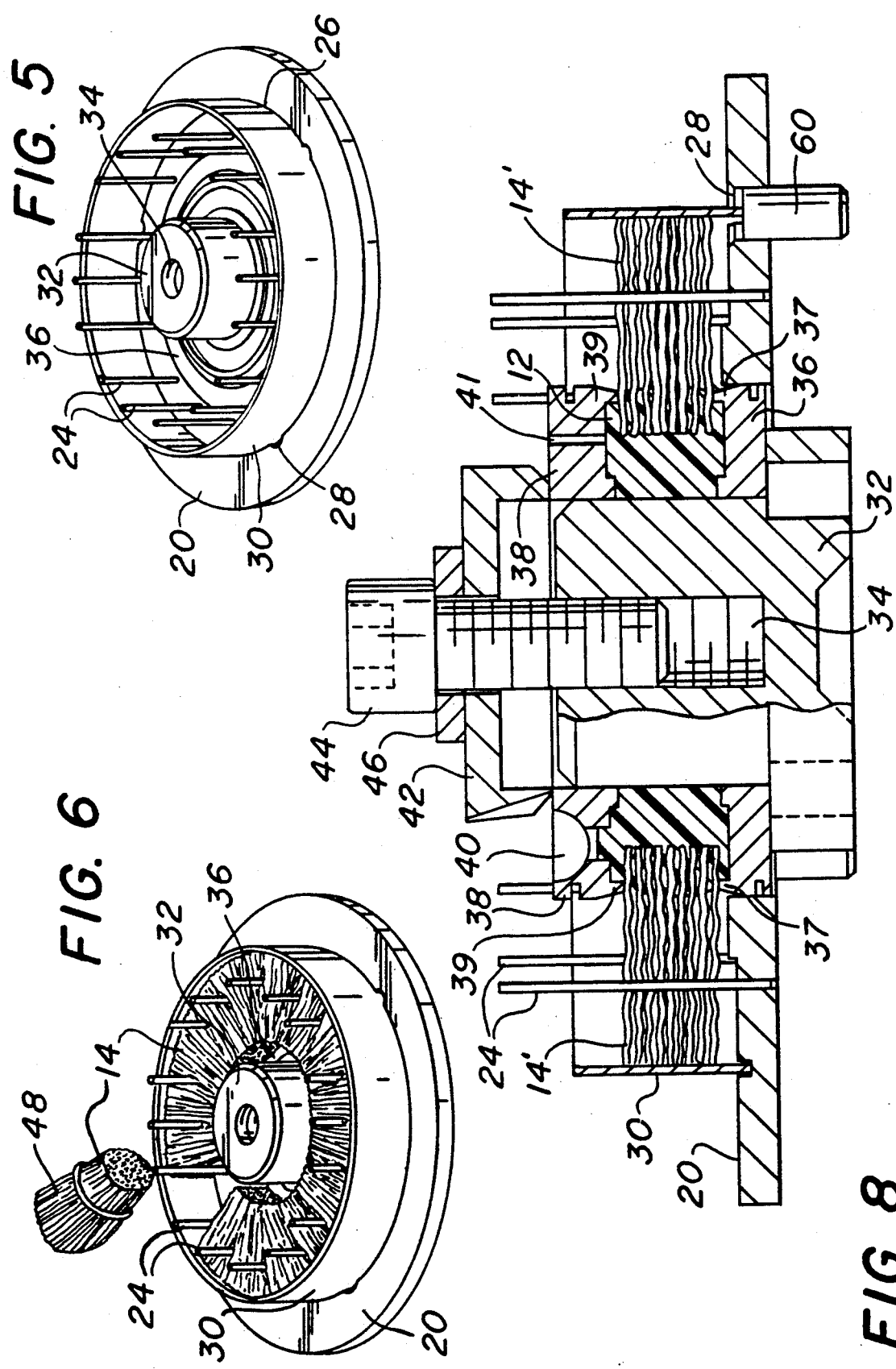

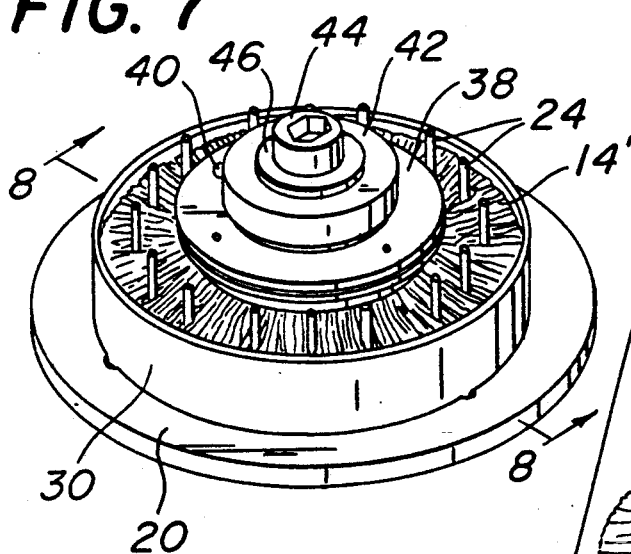
FIG. 7
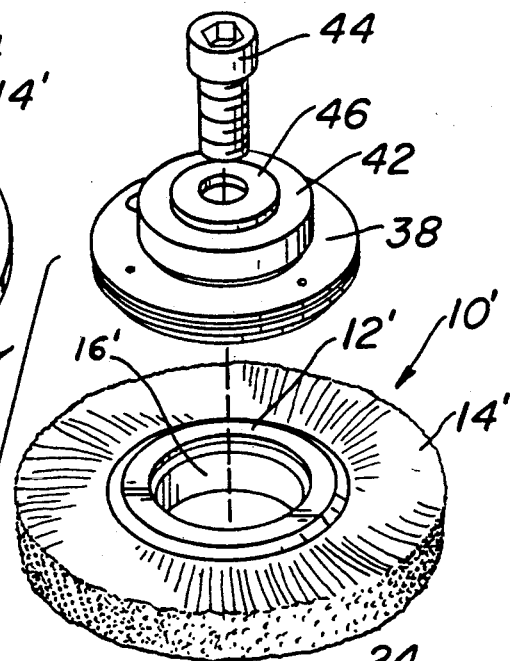
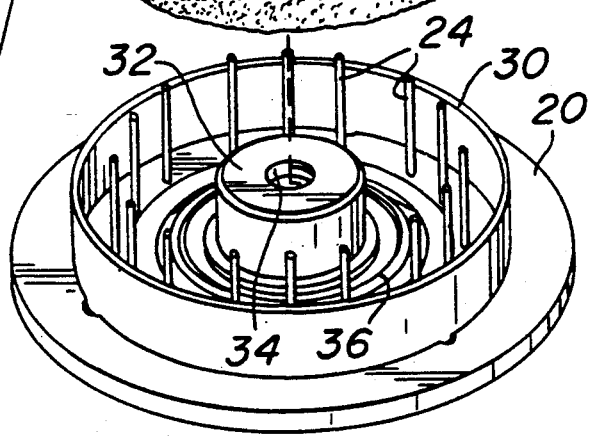
FIG. 9
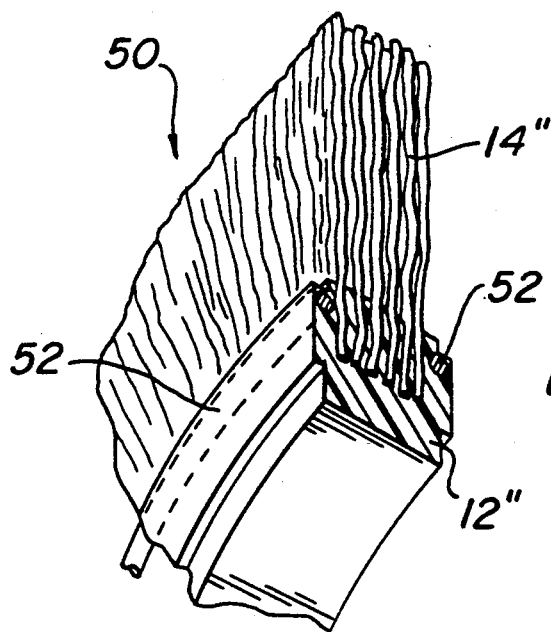
FIG. 10

1

METHOD AND APPARATUS FOR MAKING A BRUSHING TOOL

FIELD OF THE INVENTION

The present invention is directed to a method and apparatus for making a brushing tool, particularly a rotary brushing tool having a central hub and bristles extending therefrom.

BACKGROUND OF THE INVENTION

Rotary brushing tools are widely used in industry for cleaning, polishing, deburring, finishing and burnishing metals and other materials. Rotary brushes are typically constructed from individual tufts of bristle material (which may be wire or non-metallic materials such as Tampico, horsehair, nylon, and the like) which is folded in half to form a loop. The loop is used to anchor the tufts in a rotatable hub. The loops are anchored by staples or by looping them through perforations in a disk or around an annular ring. Brush constructions of this type are shown, for example, in U.S. Pat. No. 4,092,758. Other methods of anchoring the bristles, such as by thermoplastic bands, as shown for example in U.S. Pat. No. 2,190,206, are also known.

Regardless of how the bristles are anchored in the hub in prior art brushes, the bristles are almost without exception inserted into the hub in the form of individual tufts or placed in bundles around an annular ring. This is wasteful of bristle material in at least two respects. First, the need to bend the bristles in half to form a loop requires extra material in the loop. Second, because of the folding step, the ends of the bristles do not form a tuft of uniform length; the bristles on the inside of the loop will be longer than the bristles on the outside of the loop. Thus, the bristles need to be longer than actually required so that they can be trimmed to the desired length after the tufts are formed and inserted into the hub.

A good brushing tool should provide a uniform distribution of bristles at the periphery of the tool. Tuft type brushes do not provide a uniform distribution of bristles. In addition, a good brushing tool must not clamp the bristle excessively, such as by rings or staples, which would reduce the cross-sectional area of the bristle at the clamp zone. This clamping or over-clamping action causes pinpoint stress, which may cause the bristle to break prematurely. Finally, a good brushing tool should not allow the bristle to rub against a metal side plate, which also leads to breakage.

It is an object of the present invention to provide a method and apparatus for manufacturing a rotary brushing tool in which the filaments are secured to the hub in such a manner as to avoid stresses on the bristles which may cause premature breakage of the bristles.

It is another object of the present invention to provide a method of making a rotary brush which requires relatively few manual or mechanical steps in securing the bristles to the hub.

It is another object of the present invention to provide a method and apparatus for making a rotary brush in which the bristles are distributed with a uniform density around the circumference of the hub, and with minimum waste of the length of the bristles.

SUMMARY OF THE INVENTION

The present invention is a method of making a brushing tool having a hub and a plurality of bristles extending from the hub. A mold defining a cavity is provided, the cavity being divided into a mold cavity and a bristle cavity. The bristle cavity includes at least one bristle locating pin therein. At least one bundle of bristles are in inserted into the bristle cavity adjacent the at least one bristle locating pin, and so that one end of the bristles is disposed in the mold cavity. The mold cavity is then closed so that the bristles are generally clamped at one end in the mold cavity. A thixotropic material or the like is injected into the mold cavity in liquid form so that the portion of each bristle in the mold cavity is surrounded by the thixotropic material. The thixotropic material is then cured with the ends of each bristle embedded in the material, to form the hub of the brushing tool.

A preferred embodiment of the present invention is an apparatus for making a rotary brushing tool having a hub and bristles extending therefrom. Means defining a substantially cylindrical cavity are provided. A plurality of bristle locating pins are disposed annularly within the cylindrical cavity parallel to the axis of the cavity. Mold means are disposed toward the center of the cavity. The mold means includes a first mold half and a second mold half, the first and second mold halves together forming a mold cavity in the shape of the hub of the brushing tool and also forming a space therebetween for the placement of bristles. The second mold half includes a channel for the introduction of a thixotropic resin material into the mold cavity. Bundles of bristles are placed between the bristle locating pins perpendicular to the circumferential edge of the cylindrical cavity so that the inward-facing ends of the bristles are disposed within the mold cavity. When a thixotropic material is introduced into the mold cavity through the channel, the inward-facing ends of the bristles become embedded in the material as it hardens.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a plan view of another, slightly modified, rotary brushing tool, made with the apparatus shown in FIGS. 4–9.

FIG. 4 is an exploded view of the apparatus of the present invention.

FIG. 5 is a plan view of part of the apparatus of the present invention.

FIG. 6 illustrates the placement of bristle bunches in the cavity of the present invention.

FIG. 7 is a plan view of the present invention, with the bristle bunches in place and the mold closed.

FIG. 8 is a cross-sectional view through line 8—8 of FIG. 7.

FIG. 9 is a partially exploded view of the apparatus of the present invention, showing the formation of the rotary brushing tool of FIG. 3 as it is produced by the apparatus of the present invention.

FIG. 10 is a partial cross-sectional view of an alternate embodiment of a rotary brushing tool which may be made according to the present invention.

DETAILED DESCRIPTION OF THE INVENTION

Figure 1:
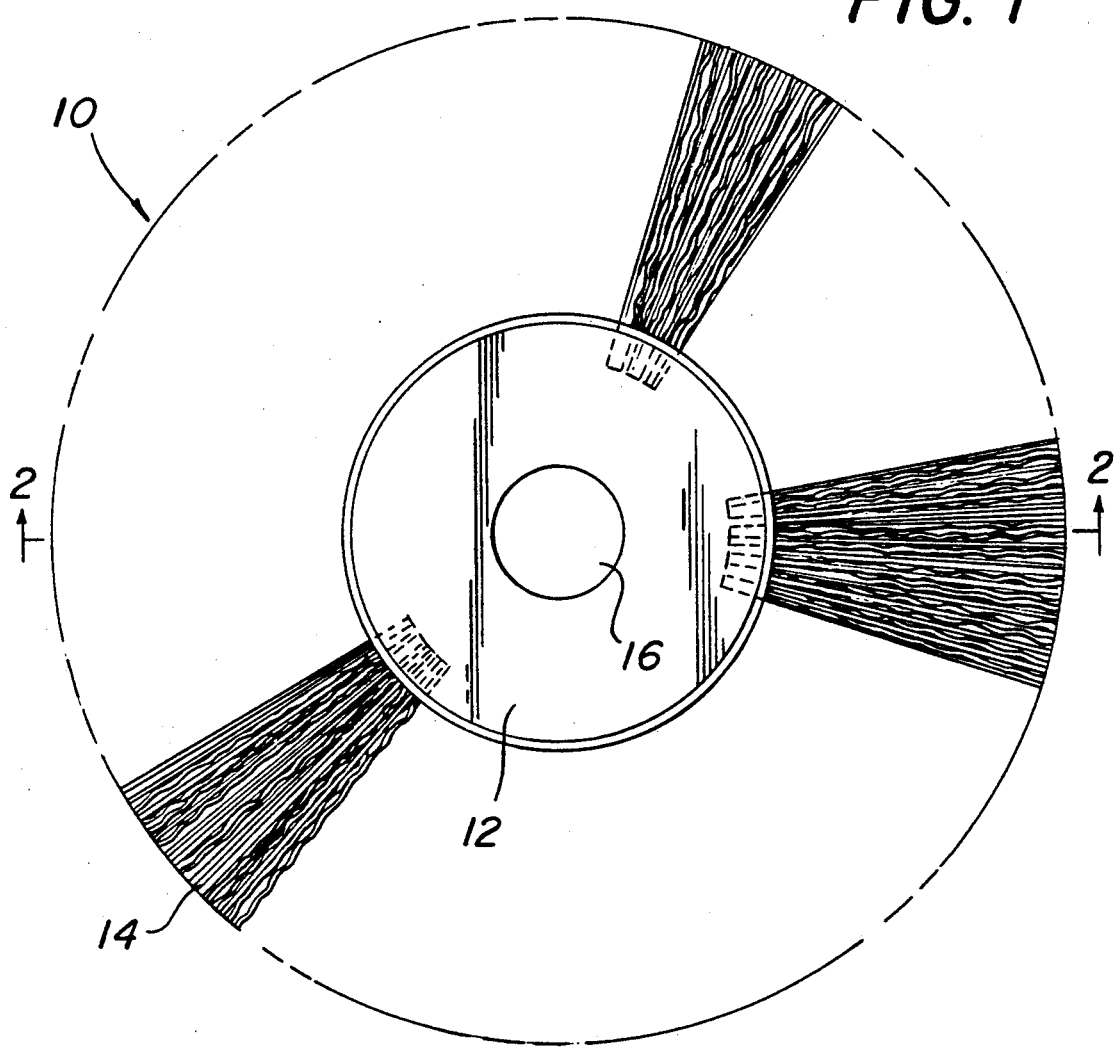
FIG. 1 is a plan view of a rotary brush tool, made in accordance with the method of the present invention.
Figure 2:
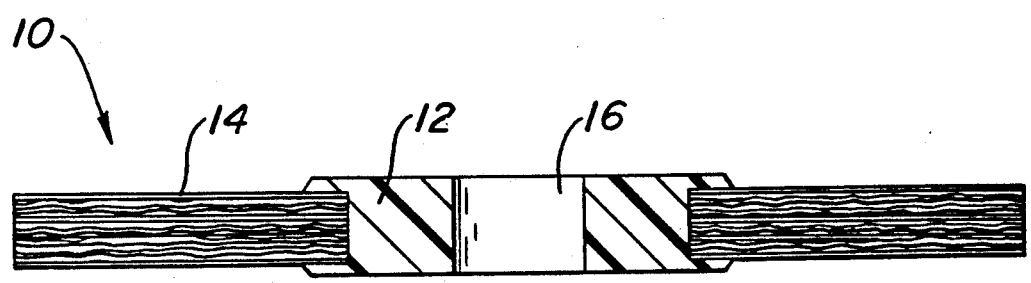
FIG. 2 is a cross-sectional view of the rotary brushing tool of FIG. 1, taken through lines 2—2 of FIG. 1.

Referring now to the drawings, wherein like numerals indicate like elements, there is shown in FIGS. 1 and 2 a rotary brushing tool 10 made according to the method and apparatus of the invention. Rotary brushing tool 10 comprises a hub 12 and bristles 14. Only portions of the bristles themselves are illustrated in FIG. 1, but it will be understood that the bristles are continuous around the entire circumference of the brushing tool 10.

Hub 12 is preferably substantially cylindrical in shape in order to facilitate the use of tool 10 as a rotary tool. However, the shape of hub 12 may be adapted as required for different uses such as cup shapes, end brush shapes, etc. Thus, although the invention is described in the context of a flat rotary brushing tool, the invention can be readily adapted for other shapes as well.

Hub 12 is provided with an axial opening 16 so that brushing tool 10 may be connected to a rotatable drive shaft, such as the rotary arbor of a machine tool. Opening 16 may be adapted as required for the particular shaft to which it is connected. Thus, opening 16 may be square, diamond shape, or any other shape as required such that rotary motion of the drive shaft is transmitted to brushing tool 10.

As best seen in FIG. 2, bristles 14 comprise individual bristle filaments of a uniform length which are embedded in hub 12. Preferably, hub 12 is made of a curable polymer material, which may be reinforced, so that individual bristle filaments may be placed in hub 12 before curing and remain firmly embedded in hub 12 after it is cured. After hub 12 is cured, bristles 14 remain firmly embedded in it without the need for mechanical retaining means such as clips, staples, bands and the like.

It can also be appreciated from the drawings that a continuous fill of bristles 14 is obtained. This results in a brushing tool which provides a uniform distribution of bristles at the periphery of the tool.

A preferred material for the bristles is a nylon material that is impregnated with abrasive particles. However, any other bristle material, such as plastic filaments or natural bristle such as vegetable fibers or animal hair, could be used as required by the particular application to which the brushing tool will be put. Bristles 14 are preferably of uniform length and extend radially from hub 12, so that no secondary trimming operation is required in order to make the bristles of the finished brush of a uniform length. Moreover, since the bristles are embedded directly in hub 12, no mechanical fasteners are required to hold the bristles in place. Since no mechanical fasteners are required, no loops are required either, thus reducing the amount of bristle material required. Preferably, the bristles are packed densely in order to obtain a substantially continuous brushing surface, i.e., a brushing surface without significant spacing between individual bristle filaments. However, a product with individual tufts could be produced if desired.

FIG. 3 shows another brushing tool 10' having the same elements as the rotary brushing tool shown in FIGS. 1 and 2, but of different proportions. FIGS. 4-9 will show how the brush 10' of FIG. 3 is manufactured according to the method and with the apparatus of the present invention, it being understood that the invention is applicable to the brushes illustrated in FIGS. 1 and 10 as well.

FIG. 4 is an exploded view of apparatus for practicing the method of the present invention. The apparatus comprises a base plate 20 in the shape of a disk, with a central opening 22. Extending perpendicular to the disk is a plurality of annularly-arranged bristle locating pins 24, the function of which will be explained below. Base plate 20 further includes a circular groove 26 and a plurality of peg holes 28 which accept securing pegs such as peg 60 shown in the cross-section of FIG. 8 by which the apparatus is held in one place. Pegs 60 may be located in corresponding holes in a base support to removably secure the apparatus.

Annular band 30 forms the outer circumference of a cylindrical cavity. One edge of the annular band 30 fits into groove 26 of base plate 20. Center member 32 fits into the central opening 22 of base plate 20. The center member may be of any required shape, as will be explained below, to create a rotary brushing tool having a central opening 16' of a particular required shape (in the present embodiment, center member 32 is cylindrical to create a round central opening 16' in the rotary brushing tool 10'). Center member 32 also includes a threaded bore 34 along its axis.

Adapted to fit around center member 32 are first mold half 36 and second mold half 38. Together mold halves 36 and 38 form a cavity in the intended shape of the hub 12'. Mold halves 36 and 38 further include central openings so that they may fit snugly around the center member 32. Of course, the central openings of the mold halves 36 and 38 are of a shape complimentary to the shape of the center member, to create a rotary brushing tool 10' having a central opening 16' of a desired shape. Mold halves 36 and 38 further include raised lips 37 and 39 near their outer perimeters. These lips 37 and 39 are in the form of raised ridges which act to clamp the bristles together securely when the mold halves 36 and 38 are urged against each other, as will be seen below. At least one of the mold halves, here 38, includes a channel 40 therein so that the material from which the hub 12 will be molded may be introduced in flowable from into the space between mold halves 36 and 38. Channel 40 may also form a sprue for the introduction of the hub material, and one of the mold halves may include additional openings such as 41 to allow the escape of air and other gases from the space between the mold halves.

Coaxial with the center member 32 and the mold halves is a clamp washer 42. Clamp washer 42 includes a central opening to accept a bolt 44, which is preferably associated with a washer 46. Bolt 44 passes through the clamp washer 42 and the central opening in second mold half 38 and engages the threaded bore 34 in center member 32.

FIG. 5 shows a number of the parts of the apparatus of the present invention as they fit together to accept the bristles and mold material for making a rotary brush. Base plate 20 is reasonably secured on a surface by use of pegs (such as 60 in FIG. 8) depending from the bottom surface and seated in peg holes 28. Annular band 30 fits into the annular groove 36 in base plate 20 to form a substantially cylindrical cavity. The plurality of bristle locating pins 24 are oriented parallel to the axis of the cylindrical cavity formed by the base plate 20 and the annular band 30. At the center of the cylindrical cavity is center member 32, and disposed around the center member 32 against the base plate 30 is lower mold half 36. These parts together form a cylindrical cavity into which bundles of bristles may be inserted in order to form the rotary brushing tool.

FIG. 6 shows the insertion of the bristles 14'. The bristles 14' are preferably, but not necessarily, arranged into small bundles 48 which may be sized so that each bundle 48 fits into the space between two of the bristle locating pins 24. The bundles 48 may be held together by small bands which may be removed as the bundle is inserted into the cavity. The bristles 14' are of such a length that one end of each bristle will be substantially in contact with the inner surface of the annular band 30 while the opposite end of each bristle is substantially radially inward of lip 37 on the lower mold half 36. In this way, the radially-inward-facing ends of the bristles 14' will project into the space between the upper and lower mold halves 36 and 38 when the upper mold half 38 is clamped to the center member 32.

The hub 12' of the rotary brushing tool 10' is preferably made of a castable resin, such as, but not limited to, epoxy, polyurethane, acrylics, polyesters, and so forth. It is further preferable that the mold material be thixotropic when it is introduced in the mold cavity. The thixotropy of the mold material, combined with the tight pinching of the bristles 14' by the lips 37 and 39 of mold halves 36 and 38, allow the mold material to be introduced into the mold cavity without running out of the mold cavity between the bristles 14'. Thus, the mold material will be restricted to the volume between the mold halves 36 and 38.

FIG. 7 shows the apparatus of the present invention arranged to accept the introduction of the thixotropic mold material. Top mold half 38 is fit over the center member 32 (not visible in FIG. 7) so that the inward-facing ends of the bristles 14 are tightly pinched between the lips 37 and 39 on mold halves 36 and 38. This clamping is effected by bolt 44 being tightened into threaded bore 34 of center member 32 and thus urging clamp washer 42 downward on mold half 38. Clamp washer 42 is preferably not threaded on its inner surface, and an ordinary washer 46 is preferably disposed between the head of bolt 44 and the clamp washer 42 to distribute clamping force over a wider area. The upper mold half 38 includes a channel 40 therethrough, which may also include a shallow cavity to act as a sprue. The channel 40 communicates with the space formed between mold halves 36 and 38 around center member 32.

FIG. 8 is a cross-sectional view of the apparatus as arranged in FIG. 7, after the castable resin has been introduced to form the hub. It can be seen clearly in FIG. 8 that the bristles 14 are effectively clamped between lips 37 and 39 on mold halves 36 and 38 by tightening bolt 44 in threaded bore 34 in center member 32. When flowable thixotropic castable resin material is introduced between the mold halves 36 and 38 through channel 40, the material flows around the center member 32 and effectively embeds the inward-facing ends of bristles 14 into the material. Upper mold half 38 may further include small openings such as 41 in FIG. 8 for the escape of gases during curing of the castable resin. After the resin between the mold halves 36 and 38 cures, it forms the hub 12' of the rotary brushing tool 10'. The shape of the central opening 16' of the rotary brushing tool 10' is simply the cross-sectional shape of the center member 32, which in the illustrated embodiment is round but may be square, toothed, etc., as required for a given application.

FIG. 9 shows the finished rotary brushing tool 10' being removed from the apparatus. After the thixotropic material of the hub 12 is cured, the bolt 44 is loosened and removed from central bore 34 and center member 32, and clamping washer 42 and upper mold half 38 are removed. Rotary brushing tool 10' may then be removed from the cavity formed by base plate 20 and annular band 30. The specific shape of hub 12 depends on the specific configuration of the mold halves 36 and 38. Mold halves 36 and 38 may be so shaped to impart to the hub 12 any type of shape, bevelling, or grooves as desired. Because the outer ends of the bristles 14 have been uniformly stacked against the inner surface of the annular band 30, no trimming of the bristles is commonly required.

The mold halves 36 and 38 may further be shaped on their inner surfaces to give the finished hub 12 an inner shoulder or groove around the opening 16, as shown in the hub 12 in FIG. 8. Such an inner shoulder permits inserting into the central opening 16 different adapters (not shown) for enabling the brushing tool 10 to be attached to a variety of arbors, such as those having a square or diamond shape, or arbors of varying diameters, such as $\frac{1}{2}$", 1", $1\frac{1}{4}$" and so forth. The use of adapters also enables the brushing tool to be made in a smaller number of stock sizes, and permits a substantial reduction in hub material for large outer diameter brushes. The hub 12 need only be of sufficient radial depth to allow a small portion of the length of the bristles 14 to be embedded therein. By providing a relatively large central opening 16 and attaching the rotary brushing tool 10 to a relatively small arbor using an adapter, a relatively small quantity of hub material need be used. This results in a brush that is lighter in weight and less expensive to produce.

FIG. 10 shows a partial cross-sectional view through another type of rotary brushing tool 50, which the apparatus of the present invention may be easily adapted to make. This rotary brushing tool 50 further includes reinforcing rings 52 embedded in the material of the hub 12", so as to increase the strength of the hub 12 if necessary. The rings 52 may be made of metal, dense plastic, or any suitable material. The brushing tool 50 is manufactured with the apparatus of the present invention simply by placing the rings 50 and 52 under and over the bristles 14" as the bristles are placed in the cavity. When the thixotropic material for the hub 12 is introduced into the mold the material will surround the ring 52, causing the rings 52 to be embedded in the hub 12 after the material is cured. Such reinforcement as given by rings 52 is particularly useful for rotary brushing tools having a short radial distance between the outer edge of the hub 12 and the edge of the central opening 16. While such a dimensioning of the hub 12 may result in substantial savings of mold material, a thin hub may not have the requisite rigidity for high-speed use, and the rings 52 provide the extra strength.

The present invention may be embodied in other specific forms without departing from the spirit or essential attributes thereof and, accordingly, reference should be made to the appended claims, rather than to the foregoing specification, as indicating the scope of the invention.

We claim:

1. A method of making a brushing tool having a hub and a plurality of bristles extending from the hub, comprising the steps of:

providing a mold defining a cavity, the cavity being divided along an interface into a closable mold cavity and a bristle receiving cavity, the mold further having at least one bristle locating pin extending within the bristle receiving cavity;

inserting into the bristle receiving cavity adjacent the at least one bristle locating pin a solid pack of bristles, so that one end of the bristles is disposed within the mold cavity;

closing the mold cavity so that the ends of the bristles within the mold cavity are generally clamped together near the interface of the mold cavity and the bristle receiving cavity and held in place thereby without additional retaining means;

introducing into the mold cavity a flowable reactive-curing thixotropic material, so that at least a portion of each bristle disposed within the mold cavity is surrounded by the thixotropic material;

causing the thixotropic material in the mold cavity to reactively cure, thereby causing the portion of each bristle in the mold cavity to become embedded and bonded in the hardened thixotropic material and the hardened thixotropic material to form the hub of the brushing tool; and removing the brushing tool from the cavity.

2. A method as in claim 1, further comprising the step of inserting into the mold cavity at least one reinforcing member.

* * * * *